United States Patent
Yi

(10) Patent No.: US 12,287,494 B2
(45) Date of Patent: Apr. 29, 2025

(54) OPTICAL APPARATUS AND DRIVING METHOD THEREFOR

(71) Applicant: LG INNOTEK CO., LTD., Seoul (KR)

(72) Inventor: Do Won Yi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 517 days.

(21) Appl. No.: 17/754,016

(22) PCT Filed: Sep. 18, 2020

(86) PCT No.: PCT/KR2020/012616
§ 371 (c)(1),
(2) Date: Mar. 21, 2022

(87) PCT Pub. No.: WO2021/054761
PCT Pub. Date: Mar. 25, 2021

(65) Prior Publication Data
US 2022/0334292 A1     Oct. 20, 2022

(30) Foreign Application Priority Data
Sep. 19, 2019   (KR) ........................ 10-2019-0115313

(51) Int. Cl.
G02B 3/14       (2006.01)
G02B 7/09       (2021.01)
G02B 7/28       (2021.01)

(52) U.S. Cl.
CPC ................ *G02B 3/14* (2013.01); *G02B 7/09* (2013.01); *G02B 7/282* (2013.01)

(58) Field of Classification Search
CPC . G02B 3/14; G02B 7/09; G02B 7/282; G02B 7/04; G03B 30/00
See application file for complete search history.

(56) References Cited

U.S. PATENT DOCUMENTS

2004/0164927 A1   8/2004   Suyama et al.
2016/0187642 A1   6/2016   Karam et al.

FOREIGN PATENT DOCUMENTS

| JP | 2007-518132 A | 7/2007 | |
| JP | 2007-531047 A | 11/2007 | |
| JP | 2007531047 | * 11/2007 | ............. G02B 26/00 |
| JP | 2012-154978 A | 8/2012 | |

OTHER PUBLICATIONS

International Search Report dated Dec. 15, 2020 in International Application No. PCT/KR2020/012616.

* cited by examiner

*Primary Examiner* — James C. Jones
(74) *Attorney, Agent, or Firm* — Saliwanchik, Lloyd & Eisenschenk

(57) ABSTRACT

An optical apparatus and a driving method therefor according to an embodiment are disclosed. The optical apparatus comprises: a lens assembly including a liquid lens; and a control circuit for generating a driving signal for driving the liquid lens, wherein the driving signal includes a first section and a second section having driving signals with different waveform shapes.

8 Claims, 13 Drawing Sheets

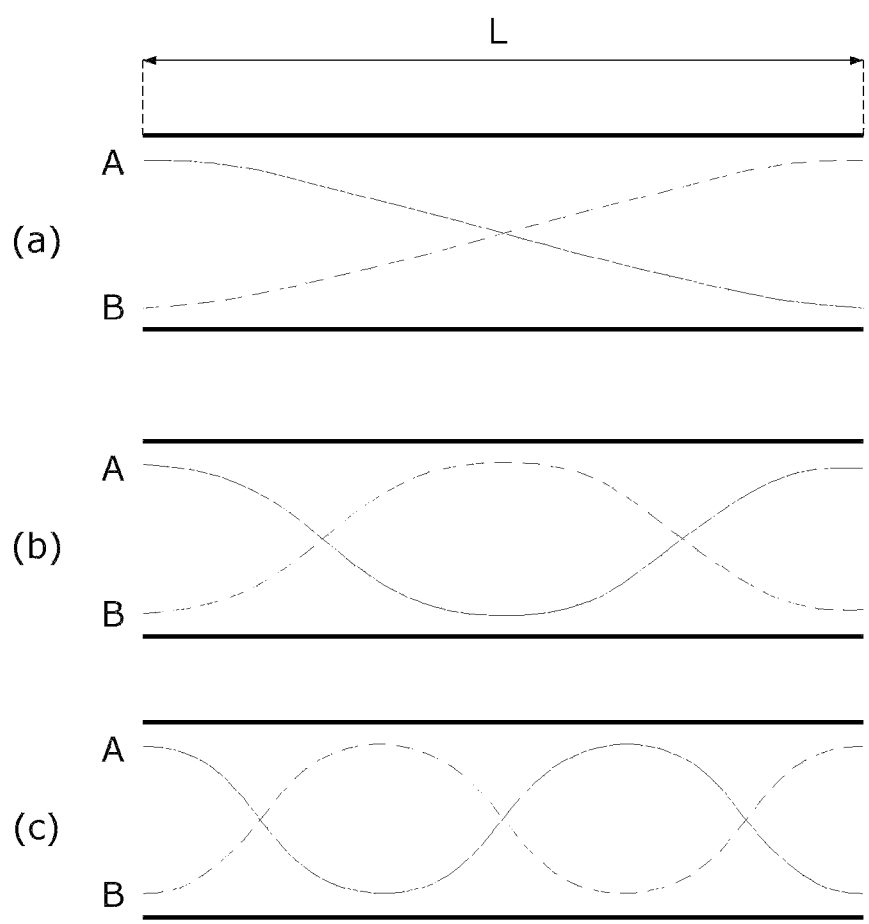

OPTICAL APPARATUS AND DRIVING METHOD THEREFOR

CROSS-REFERENCE TO RELATED APPLICATIONS

This application is the U.S. national stage application of International Patent Application No. PCT/KR2020/012616, filed Sep. 18, 2020, which claims the benefit under 35 U.S.C. § 119 of Korean Application No. 10-2019-0115313, filed Sep. 19, 2019, the disclosures of each of which are incorporated herein by reference in their entirety.

TECHNICAL FIELD

The present invention relates to an optical device, and more specifically, to an optical device and a method of driving the same.

BACKGROUND ART

A user of a portable device requires an optical device having a high resolution, a small size, and various image capturing functions. For example, the various image capturing functions may be one or more among an optical zoom function (zoom-in/zoom-out), an auto auto-focusing (AF) function, and an optical image stabilizer (OIS) function.

Conventionally, in order to realize the above-described various image capturing functions, several lenses are combined, and a method of moving the combined lenses is used. However, when the number of lenses increases, a size of the optical device may increase.

AF and OIS functions are performed by moving or tilting several lenses fixed to a lens holder and aligned along an optical axis in an optical axis direction or a direction perpendicular to the optical axis. To this end, a separate lens driving unit configured to drive a lens assembly including a plurality of lenses is required. However, the lens driving unit consumes high power, a cover glass for protecting the lens driving unit is additionally needed in addition to the camera module, and thus there is a problem of an increase in total size of the conventional camera module. In order to solve the problem, studies on a liquid lens part which performs AF and OIS functions by electrically adjusting a curvature of an interface between two liquids are being carried out.

However, there is a problem in which an error occurs due to a change in wavefront at a liquid lens part.

Technical Problem

The present invention is directed to providing an optical device and a method of driving the same.

Technical Solution

One aspect of the present invention provides an optical device including a lens assembly including a liquid lens and a control circuit configured to generate a driving signal for driving the liquid lens, wherein the driving signal includes a first section and a second section in which driving signals have different waveforms.

A first driving signal having a form of a standing wave may be generated in the first section, and a second driving signal having a form of a pulse wave may be generated in the second section.

The control circuit may generate a signal longer than or equal to ¼ of one period of the first driving signal.

The control circuit may generate a signal shorter than or equal to ½ of one period of the first driving signal.

An amplitude of the first driving signal may be smaller than or equal to an amplitude of the second driving signal.

A frequency of the first driving signal may be in the range of 80 Hz to 150 Hz.

The frequency of the first driving signal may be determined by a wavenumber, a density and a surface tension of a liquid, and a diameter of a lens.

The liquid lens may be designed to have characteristics of a capillary wave.

Another aspect of the present invention provides a method of driving an optical device including generating, by a control circuit, a driving signal for driving a liquid lens and applying, by the control circuit, the generated driving signal to the liquid lens, wherein the driving signal includes a first section and a second section in which driving signals have different waveforms.

Advantageous Effects

According to embodiments, a wavefront error (WFE) can be reduced without changing a reaction speed by generating a driving signal having a waveform which varies according to a section for adjusting an interface of a liquid lens.

According to the embodiments, the interface of the liquid lens can be adjusted in consideration of characteristics of the liquid lens.

DESCRIPTION OF DRAWINGS

FIG. 10 is a set of views for describing a principle of generating the driving signal according to the embodiment.

MODES OF THE INVENTION

Figure 1:
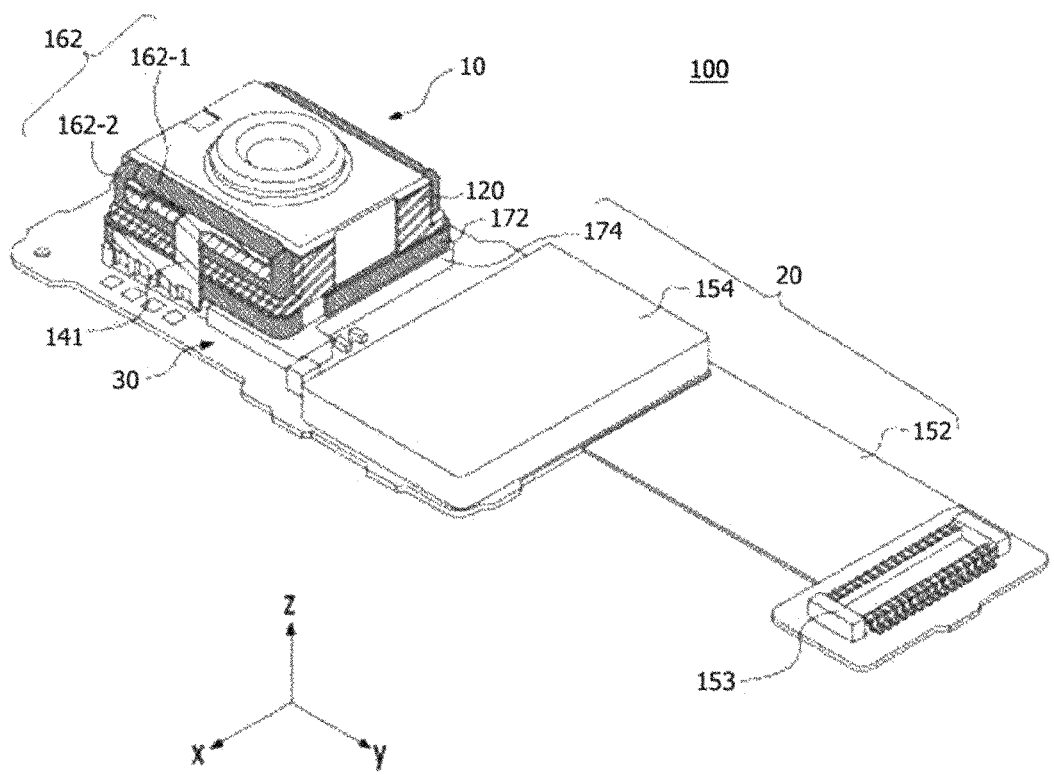
FIG. 1 is a schematic perspective view illustrating a camera module according to an embodiment.

Hereinafter, exemplary embodiments of the present invention will be described in detail with reference to the accompanying drawings.

However, the technical spirit of the present invention is not limited to the few embodiments which will be described and may be realized in a variety of different forms, and one or more components of the embodiments may be selectively combined, substituted, and used within the range of the technical spirit.

In addition, unless clearly and specifically defined otherwise by the context, all terms (including technical and scientific terms) used herein can be interpreted as having meanings generally understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on or under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

An embodiment proposes an optical device driving mechanism, in which a driving signal having a waveform, which varies according to a section for adjusting an interface of a liquid lens, is generated, a driving signal having the form of a standing wave is generated in a section in which the interface of the liquid lens is formed, and a driving signal having the form of a pulse wave is generated in a section in which the interface of the liquid lens is maintained.

In this case, the concept of the optical device may encompass a camera module, a lens module, a lens control unit, and the like. In the embodiment below, an example of a case in which the optical device is a camera module will be described.

FIG. 1 is a schematic perspective view illustrating a camera module according to an embodiment.

Referring to FIG. 1, a camera module 100 may include a lens assembly 10, a control circuit 20, and an image sensor 30.

First, the lens assembly 10 may include a plurality of lens parts and a holder for accommodating the plurality of lens parts. As will be described below, the plurality of lens parts may include a liquid lens and may further include a first lens part or second lens part. The plurality of lens parts may include the first and second lens parts and a liquid lens part.

The control circuit 20 serves to supply a driving voltage (or operating voltage) to the liquid lens part.

The control circuit 20 and the image sensor 30 may be disposed on one printed circuit board (PCB), but this is only one example and the embodiment is not limited thereto.

When the camera module 100 according to the embodiment is applied to an optical device (or optical instrument), a structure of the control circuit 20 may be designed to be different according to a specification required for the optical device. Particularly, the control circuit 20 may be implemented as a single chip and reduce a magnitude of a driving voltage applied to the lens assembly 10. Accordingly, a size of the optical device mounted on a portable device becomes smaller. This will be described in detail below.

Figure 2:
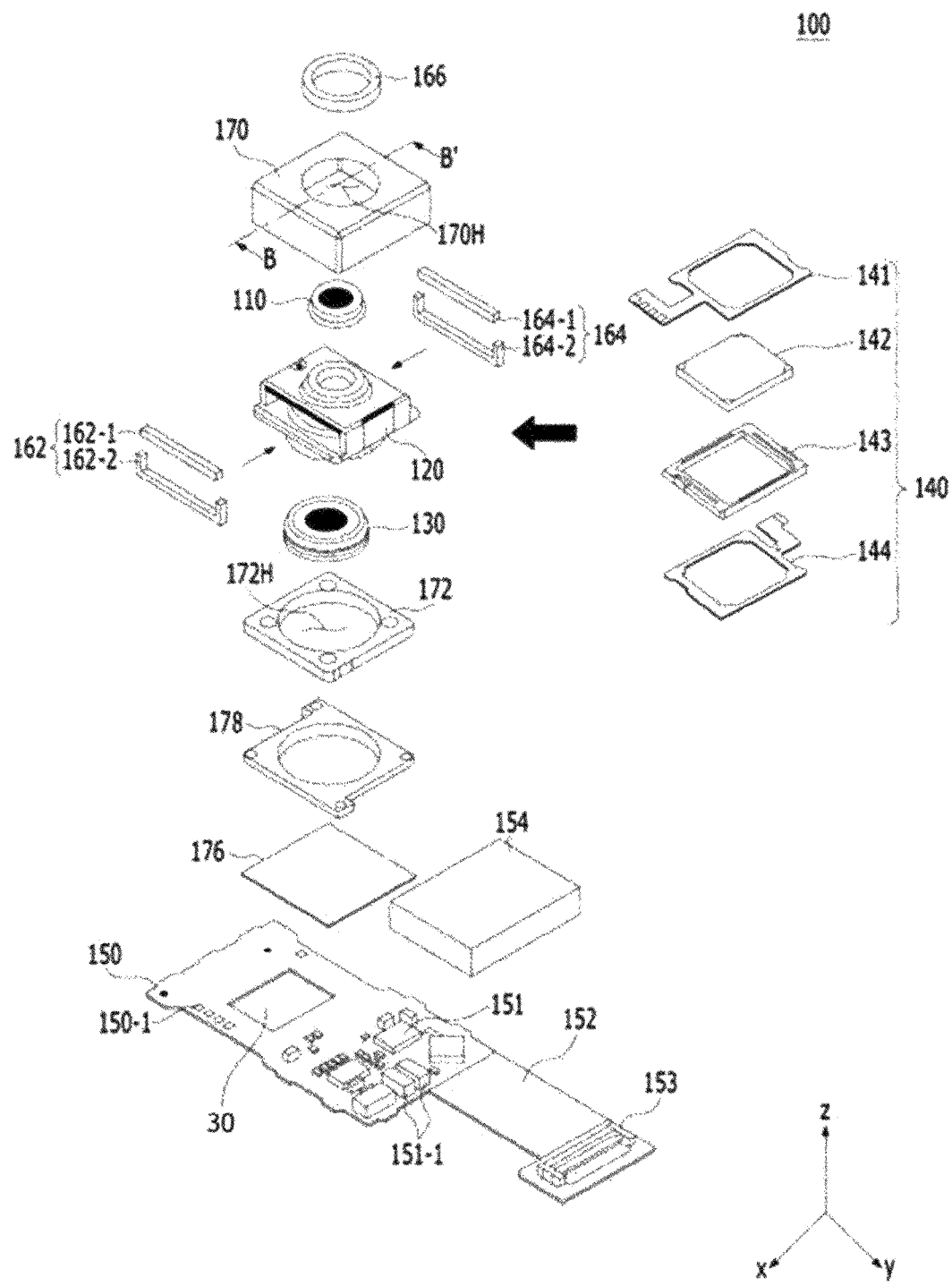
FIG. 2 is an exploded perspective view illustrating the camera module according to the embodiment.
Figure 3:
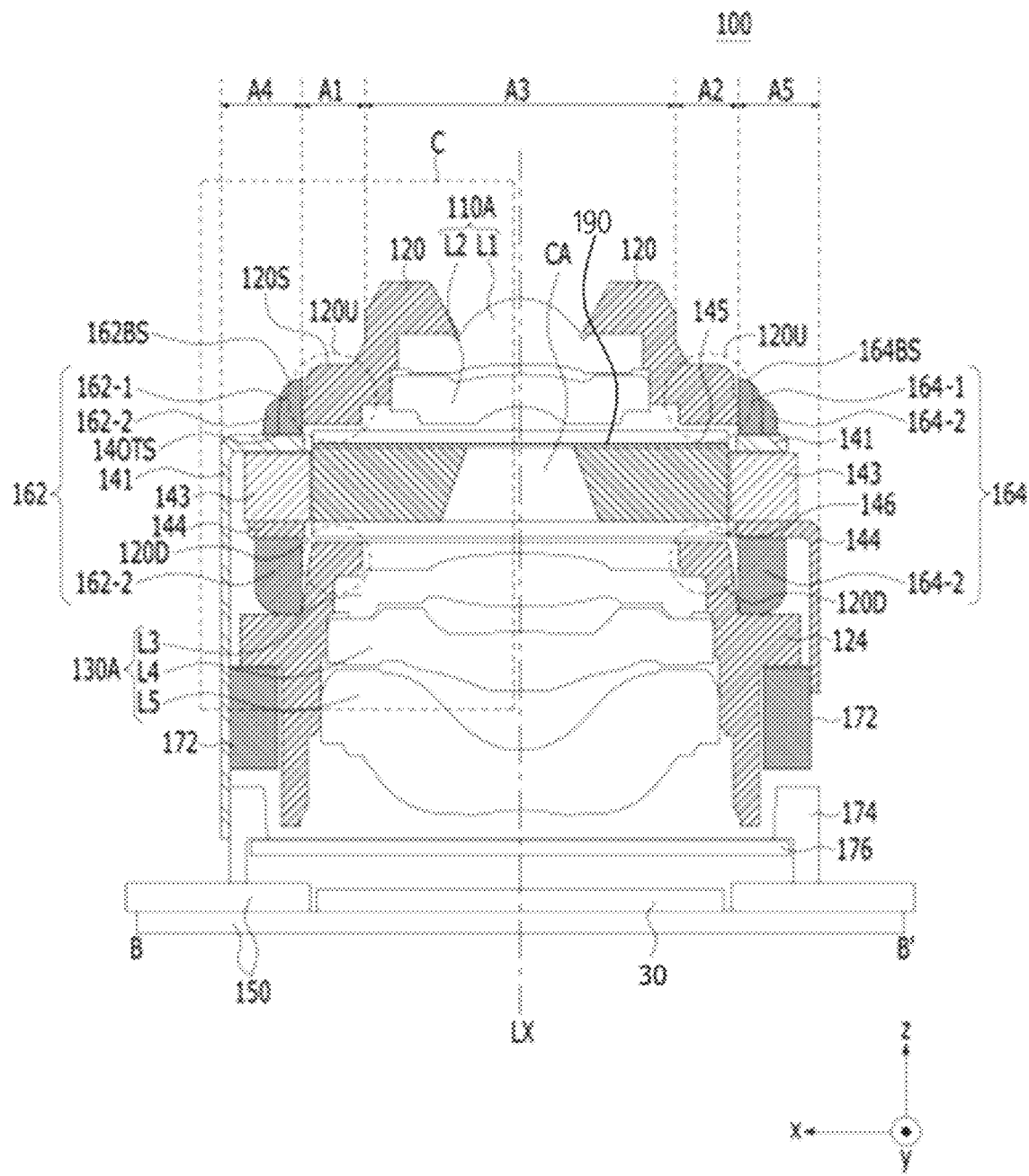
FIG. 3 is a cross-sectional view illustrating the camera module according to the embodiment.
Figure 4:
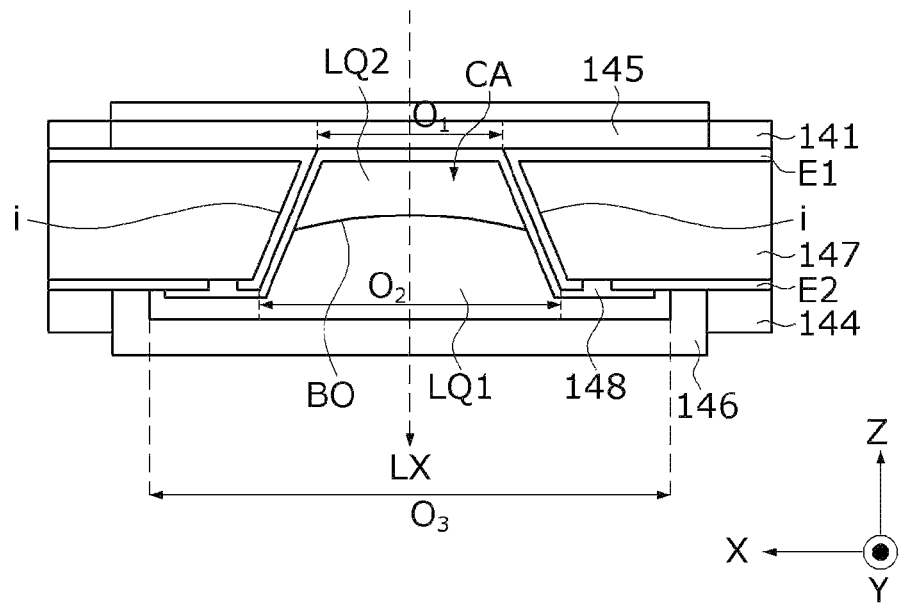
FIG. 4 is a cross-sectional view illustrating a liquid lens part according to the embodiment.

FIG. 2 is an exploded perspective view illustrating the camera module according to the embodiment, FIG. 3 is a cross-sectional view illustrating the camera module according to the embodiment, and FIG. 4 is a cross-sectional view illustrating the liquid lens part according to the embodiment.

Referring to FIGS. 2 and 3, the camera module 100 may include the lens assembly, a main substrate 150, and the image sensor 30. In addition, the camera module 100 may further include a first cover 170 and a middle base 172. In addition, the camera module 100 may further include one or more adhesive members 162 and 164 and a second cover 174. At least one adhesive member serves to couple or fix a liquid lens part 140 to a holder 120.

In this case, it is illustrated that one or more adhesive members include all of a first adhesive member 162, a second adhesive member 164, and a third adhesive member 166, but the embodiment is not limited thereto. That is, according to another embodiment, one or more adhesive members may also include some of the first adhesive member 162, the second adhesive member 164, and the third adhesive member 166.

In addition, according to the embodiment, one or more components 110 to 190 of the camera module 100 illustrated in FIG. 2 may be omitted. Alternatively, one of more components which are different from the components 110 to 190 illustrated in FIG. 2 may be further included in the camera module 100.

For the sake of convenience in the description, the third adhesive member 166, the first cover 170, the second cover 174, and an optical layer 190, which are illustrated in FIG. 2, are omitted in FIG. 3.

In addition, the lens assembly 10 (see FIG. 1) may include at least one among the liquid lens part 140, the holder 120, first lens parts 110 and 110A, and second lens parts 130 and 130A, and at least one among the first adhesive member 162, the second adhesive member 164, and the third adhesive member 166. In addition, the lens assembly may be disposed on the main substrate 150.

In addition, in order to distinguish the first lens parts 110 and 110A and the second lens parts 130 and 130A from the liquid lens part 140 in the lens assembly, the first lens parts 110 and 110A and the second lens parts 130 and 130A may be referred to as "first solid lens parts" and "second solid lens parts," respectively.

The first lens parts 110 and 110A may be disposed at an upper side of the lens assembly and may be a region through which light is incident from the outside of the lens assembly. That is, the first lens parts 110 and 110A may be disposed on the liquid lens part 140 in the holder 120. The first lens parts 110 and 110A may be implemented as one lens or two or more lenses, that is, a plurality of lenses which are aligned with each other along a central axis to constitute an optical system. In this case, the central axis may be an optical axis LX of an optical system formed by the first lens parts 110 and 110A, the liquid lens part 140, and the second lens parts 130 and 130A which are included in the camera module 100 or an axis parallel to the optical axis LX. The optical axis LX may be the same as an optical axis of the image sensor 30.

That is, the first lens parts 110 and 110A, the liquid lens part 140, the second lens parts 130 and 130A, and the image sensor 30 may be aligned with each other and disposed along the optical axis LX in an active align (AA) manner. In this case, the term "AA" may indicate an operation of matching optical axes of the first lens parts 110 and 110A, the second lens parts 130 and 130A, and the liquid lens part 140 and adjusting axes or a relationship between distances of the image sensor 30 and the lens parts 110, 110A, 130, 130A, and 140.

As one embodiment, AA may be performed through an operation of analyzing image data generated by the image sensor 30 by receiving light incident from a specific object through at least one among the first lens parts 110 and 110A, the second lens parts 130 and 130A, and the liquid lens part 140. For example, AA may be performed in the following order.

As an example, after AA (first alignment) of adjusting relative positions of the first lens parts 110 and 110A, the second lens parts 130 and 130A, and the image sensor 30, which are fixedly installed in the holder 120, is completed, AA (second alignment) of adjusting relative positions of the liquid lens part 140 and the image sensor 30 inserted into the holder 120 may be performed. The first alignment may be performed by various ly changing the positions while a gripper holds the middle base 172, and the second alignment may be performed by variously changing the positions while the gripper holds a spacer 143 of the liquid lens part 140. However, AA may also be performed in an order different from the above-described order.

In addition, the holder 120 may include an upper holder region 120U disposed on the liquid lens part 140 and a lower holder region 120D disposed under the liquid lens part 140. In this case, the first and second adhesive members 162 and 164 may couple the upper holder region 120U and the lower holder region 120D to the liquid lens part 140.

In addition, when the first and second adhesive members 162 and 164 are disposed, the liquid lens part 140 may be stably and fixedly coupled to the holder 120.

In addition, the first lens part 110A may include, for example, two lenses L1 and L2, but this is only exemplary and the number of lenses included in the first lens part 110A may be one or more.

In addition, an exposure lens may be disposed at an upper side of the first lens parts 110 and 110A. In this case, the exposure lens may be an outermost lens among the lenses included in the first lens parts 110 and 110A. That is, since the lens L1 positioned at an uppermost side of the first lens part 110A protrudes upward, the lens L1 may serve as the exposure lens. Since the exposure lens protrudes outward from the holder 120, there is a possibility in which a surface of the exposure lens is damaged. When the surface of the exposure lens is damaged, quality of an image captured by the camera module 100 may be degraded. Accordingly, a cover glass may be disposed above the exposure lens or a coating layer may be formed thereon in order to inhibit and suppress surface damage of the exposure lens. Alternatively, the exposure lens may be formed of a wear-resistant material which is harder than that of the other lens of the lens part in order to inhibit surface damage of the exposure lens.

In addition, outer diameters of the lenses L1 and L2 included in the first lens part 110A may increase toward lower portions of the lenses L1 and L2 (for example, in a −z-axis direction), but the embodiment is not limited thereto.

Light incident through the first lens parts 110 and 110A from the outside of the camera module 100 may pass through the liquid lens part 140 and may be incident on the second lens parts 130 and 130A. The second lens parts 130 and 130A may also be implemented as one lens or two or more lenses, that is, a plurality of lenses which are aligned with each other along a central axis to constitute an optical system. For example, as illustrated in FIG. 3, the second lens part 130A may include three lenses L3, L4, and L5, but this is exemplary and the number of lenses included in the second lens parts 130 and 130A may be two or less or four or more.

In addition, outer diameters of the lenses L3, L4, and L5 included in the second lens part 130A may increase toward lower portions of the lenses L3, L4, and L5 (for example, in the −z-axis direction), but the embodiment is not limited thereto.

In addition, unlike the liquid lens part 140, the first lens parts 110 and 110A and the second lens parts 130 and 130A may be implemented as solid lenses formed of glass or plastic, but the present invention is not limited to specific materials of the first lens parts 110 and 110A and the second lens parts 130 and 130A.

In addition, the liquid lens part 140 may include first to fifth regions A1, A2, A3, A4, and A5. Specifically, the fourth region A4 and the fifth region A5 may be disposed at outermost sides of the camera module 100, and the first region A1, the second region A2, and the third region A3 may be disposed between the fourth region A4 and the fifth region A5. In addition, the third region A3 may be disposed between the first region A1 and the second region A2. In addition, the first region A1 may be disposed between the fourth region A4 and the third region A3, and the second region A2 may be disposed between the third region A3 and the fifth region A5.

In other words, the first region A1 and the second region A2 may be regions disposed inside openings formed in side surfaces of the holder 120. The third region A3 may be a region between the first region A1 and the second region A2. In addition, the fourth region A4 and the fifth region A5 are regions which protrude from the openings of the holder 120 and are disposed at the outside of the holder 120.

Hereinafter, the first adhesive member 162 and the second adhesive member 164 will be described, and the liquid lens part 140 will be described below.

The first adhesive member 162 may include first and second adhesive portions 162-1 and 162-2, and the second adhesive member 164 may include third and fourth adhesive portions 164-1 and 164-2. Each of the adhesive portions may include an adhesive, an epoxy, and the like.

First, the first adhesive portion 162-1 couples the holder 120 and an upper surface 140TS of the fourth region A4 of the liquid lens part 140, and the third adhesive portion 164-1 couples the holder 120 and an upper surface of the fifth region A5 of the liquid lens part 140. In this case, it is illustrated that the upper surface 140TS of each of the fourth region A4 and the fifth region A5 of the liquid lens part 140 is an upper surface of a first connecting substrate 141, but the embodiment is not limited thereto. For example, when the liquid lens part 140 does not include connecting substrates 141 and 144 or the spacer 143, an upper surface of the liquid lens part 140 may be an upper surface of the liquid lens 142.

In addition, the holder 120 may include an upper holder portion disposed on the liquid lens part 140 (or the liquid lens 142) and a lower holder portion disposed under the liquid lens part 140 (or the liquid lens 142). In addition, the holder 120 may include a sidewall facing a side surface of the liquid lens 142 or the liquid lens part 140. The first adhesive portion 162-1 and the third adhesive portion 164-1 may couple the upper holder region 120U and the liquid lens part 140. Accordingly, since the first adhesive portion 162-1 and the third adhesive portion 164-1 couple the holder 120 and the liquid lens part 140, the liquid lens part 140 may be fixed to the holder 120.

In addition, the second adhesive portion 162-2 may couple the holder 120 and a lower surface 140BS and a side surface of the fourth region A4 of the liquid lens part 140. In this case, it is illustrated that the lower surface 140BS of the liquid lens part 140 is a lower surface of the second connecting substrate 144 and a side surface of the liquid lens part 140 is a side surface of the spacer 143, but the embodiment is not limited thereto. For example, when the liquid lens part 140 does not include the first and second connecting substrates 141 and 144 or the spacer 143, a lower surface or the side surface of the liquid lens part 140 may be a lower surface or the side surface of the liquid lens 142, respectively. Similarly, the fourth adhesive portion 164-2 may couple the holder 120 and the lower surface 140BS and side surface 140SS of the fifth region A5 of the liquid lens part 140. In this case, the lower surface 140BS of the liquid lens part 140 may be the lower surface of the second connecting substrate 144, and the side surface 140SS of the liquid lens part 140 may be the side surface of the spacer 143, but the embodiment is not limited thereto. For example, when the liquid lens part 140 does not include the connecting substrates 141 and 144 or the spacer 143, the lower surface or side surface of the liquid lens part 140 may be the lower surface or side surface of the liquid lens 142, respectively.

In addition, the second adhesive portion 162-2 and the fourth adhesive portion 164-2 may couple the lower holder region 120D and the liquid lens part 140. Accordingly, the second adhesive portion 162-2 and the fourth adhesive portion 164-4 couple the holder 120 and the liquid lens part 140 to seal the openings of the holder 120. For example, the first adhesive portion 162-1 and the second adhesive portion 164-1 may be connected to each other, and the third adhesive portion 164-1 and the fourth adhesive portion 164-2 may be connected to each other so that the above-described sealing may be performed.

Although not illustrated, the third adhesive member 166 may be disposed to fill a separation space (or gap) between an upper surface of the holder 120 and the first cover 170. In addition, the third adhesive member 166 may be omitted as necessary. In this case, the separation space between the upper surface of the holder 120 and the first cover 170 may be empty.

The embodiment is not limited to shapes of the first to third adhesive members 162, 164, and 166 described above. That is, as long as an inner portion of the holder 120 may be sealed to inhibit foreign matter from being introduced into the holder 120 through the openings of the holder 120, the first to third adhesive members 162, 164, and 166 may have various shapes. For example, in a state in which the first adhesive member 162 and the second adhesive member 164 are disposed to seal the openings of the holder 120, when the third adhesive member 166 is disposed to fill the separation space between the upper surface of the holder 120 and the first cover 170, the third region A3 of the liquid lens part 140 disposed in an inner space of the holder 120 may be sealed from the outside. Accordingly, reliability against foreign matter of the camera module 100 according to the embodiment can be improved, degradation of optical performance can be inhibited, and a defect rate thereof can be reduced.

In addition, the first to fourth adhesive portions 162-1, 164-1, 162-2, and 164-2 may have various shapes. That is, the first adhesive portion 162-1, the second adhesive portion 162-2, the third adhesive portion 164-1, and the fourth adhesive portion 164-2 may have shapes corresponding to shapes of the openings of the holder 120.

In addition, an adhesive may be disposed in the first and second regions A1 and A2 in addition to the fourth region A4 and the fifth region A5 but is not limited thereto.

In addition, the first cover 170 may be disposed to surround the holder 120, the liquid lens part 140, the middle base 172, and a sensor base 178. Accordingly, the first cover 170 may be in contact with an upper surface 120S of a shoulder side of the holder 120. In this case, when levels of upper surfaces 162S of the first adhesive portion 162-1 and the third adhesive portion 164-1 are higher than a level of the upper surface 120S of the shoulder side of the holder 120, the first cover 170 may be in contact with the upper surfaces 162S of the first adhesive portion 162-1 and the third adhesive portion 164-1 instead of the upper surface 120S of the holder 120 at the shoulder side. Accordingly, the first cover 170 may be unstably fixed to the holder 120. In order to inhibit this, the upper surface 120S of the holder 120 may be disposed at the level different from the level of the upper surface 162S of the first adhesive portion 162-1 by a predetermined level. Similarly, the level of the upper surface 120S of the holder 120 may be higher than a level of an upper surface 164S of the third adhesive portion 164-1 by a predetermined level.

In addition, the upper surface 120S of the holder 120 may be collinearly with the upper surface 162S of the first adhesive portion 162-1, and upper surface 120S of the holder 120 may be collinearly with the upper surface 164S of the third adhesive portion 164-1.

In addition, the liquid lens part 140 mentioned in description of features of the first adhesive member 162 and the second adhesive member 164 was described as including the first and second connecting substrates 141 and 144. However, the liquid lens part 140 mentioned in description of the features of the first adhesive member 162 and the second adhesive member 164 need not include the first and second connecting substrates 141 and 144.

In addition, the first cover 170 may be disposed to surround the holder 120, the liquid lens part 140, the third adhesive member 166, and the middle base 172 to protect the holder 120, the liquid lens part 140, the third adhesive member 166, and the middle base 172 from an external impact. Particularly, the first cover 170 may be disposed to protect a plurality of lenses constituting an optical system from an external impact.

In addition, the first cover 170 may include an upper opening 170H formed in an upper surface thereof. Accordingly, the first lens parts 110 and 110A disposed in the holder 120 may be exposed to external light.

In addition, the middle base 172 may be disposed to surround a hole of the holder 120. Accordingly, the middle base 172 may include an accommodation hole 172H for accommodating the hole of the holder 120. An inner diameter of the middle base 172 (that is, a diameter of the accommodation hole 172H) may be greater than or equal to an outer diameter of the hole of the holder 120. In addition, it is illustrated that the accommodation hole 172H of the middle base 172 and the hole of the holder 120 are circular shapes, but the embodiment is not limited thereto, and the shapes of the accommodation hole 172H of the middle base 172 and the hole of the holder 120 may be variously changed. In addition, the middle base 172 may be mounted on the main substrate 150 to be spaced apart from circuit elements 151.

Like the upper opening 170H of the first cover 170, the accommodation hole 172H may be disposed at a position corresponding to a position of the image sensor 30 disposed in the camera module 100 near a central portion of the middle base 172.

In addition, the camera module 100 may further include the sensor base 178 and a filter 176 and may also further include a circuit cover 154.

The filter 176 may filter light passing through the first lens parts 110 and 110A, the liquid lens part 140, and the second lens parts 130 and 130A based on a specific wavelength band. The filter 176 may be an infrared (IR) light cut-off filter or ultraviolet (UV) light cut-off filter, but the embodiment is not limited thereto.

In addition, the filter 176 may be disposed on the image sensor 30. The filter 176 may be disposed in the sensor base 178. For example, the filter 176 may be disposed on an inner groove or stepped portion of the sensor base 178.

The sensor base 178 may be disposed under the middle base 172 and attached to the main substrate 150. The sensor base 178 may surround the image sensor 30 to protect the image sensor 30 from external foreign matter or an external impact.

Next, the main substrate 150 may be disposed under the middle base 172 and may include a groove, in which the image sensor 30 may be installed, seated, in contact with, fixed, temporarily fixed, supported, or accommodated, the circuit elements 151, a connecting part (or flexible printed circuit board (FPCB)) 152, and a connector 153.

Specifically, the main substrate 150 may include a holder region in which the holder 120 is disposed and an element region in which the plurality of circuit elements 151 are disposed.

The main substrate 150 may be implemented as a rigid flexible printed circuit board (RFPCB) including the FPCB 152. The FPCB 152 may be bent according to requirements for a space in which the camera module 100 is installed.

In addition, the circuit elements 151 of the main substrate 150 may constitute a control module configured to control the liquid lens part 140 and the image sensor 30. Here, the control module will be described below.

In addition, the circuit elements 151 may include one or more of passive elements and active elements and may have one of various areas and one of various heights. The plurality of circuit elements 151 may be provided, a height of the plurality of circuit elements 151 may be higher than a height of the main substrate 150, and the plurality of circuit elements 151 may protrude outward. The plurality of circuit elements 151 may be disposed to not overlap the holder 120 in a direction parallel to the optical axis LX. For example, the plurality of circuit elements 151 may include a power inductor, a gyro sensor, and the like, but the embodiment is not limited to a specific type of circuit elements 151.

The circuit cover 154 may be disposed to cover the circuit elements 151. Accordingly, the circuit cover 154 may protect the circuit elements 151 disposed on the main substrate 150 from an external impact. In addition, to this end, the circuit cover 154 may include an accommodation space for accommodating and covering the circuit elements 151 disposed on the main substrate 150 in consideration of shapes and positions of the circuit elements 151. In addition, the circuit cover 154 may serve an electromagnetic blocking function.

The image sensor 30 may serve a function of converting light passing through the first lens parts 110 and 110A, the liquid lens part 140, and the second lens parts 130 and 130A of the lens assembly 110, 120, 130, 140, 162, and 164 into image data. More specifically, the image sensor 30 may convert light into an analog signal through a pixel array including a plurality of pixels and synthesize a digital signal corresponding to the analog signal to generate image data.

Referring to FIGS. 3 and 4, the liquid lens part 140 may include a first connecting substrate (or individual electrode connecting substrate) 141, the liquid lens (or liquid lens body) 142, the spacer 143, and the second connecting substrate (or common electrode connecting substrate) 144.

The first connecting substrate 141 may electrically connect a plurality of first electrodes (not shown) included in the liquid lens 142 to the main substrate 150 and may be disposed on the liquid lens 142. The first connecting substrate 141 may be implemented as an FPCB.

In addition, the first connecting substrate 141 may be electrically connected to electrode pads 150-1 formed on the main substrate 150 through connecting pads 141-1 electrically connected to the plurality of first electrodes. To this end, after the liquid lens part 140 is inserted into the inner space of the holder 120, and after the first connecting substrate 141 is bent toward the main substrate 150 in the −z-axis direction, the connecting pads 141-1 and the electrode pads 150-1 may be electrically connected by a conductive epoxy. As another embodiment, the first connecting substrate 141 may be connected to conductive first holder surface electrodes disposed, formed, or applied on a surface of the holder 120 and may be electrically connected to the main substrate 150 through the conductive first holder surface electrodes disposed on the holder 120, but the embodiment is not limited thereto.

The second connecting substrate 144 may electrically connect second electrodes (not shown) included in the liquid lens 142 to the main substrate 150 and may be disposed under the liquid lens 142. The second connecting substrate 144 may be implemented as an FPCB or single metal substrate (conductive metal plate).

In addition, the second connecting substrate 144 may be electrically connected to the electrode pads formed on the main substrate 150 through connecting pads electrically connected to the second electrodes. To this end, after the liquid lens part 140 is inserted into the inner space of the holder 120, the second connecting substrate 144 may be bent toward the main substrate 150 in the −z-axis direction. As another embodiment, the second connecting substrate 144 may be connected to conductive surface electrodes disposed, formed, or applied on the surface of the holder 120 and electrically connected to the main substrate 150 through the conductive surface electrodes disposed on the surface of the holder 120, but the embodiment is not limited thereto.

The liquid lens 142 may include a cavity CA. In addition, in the cavity CA, an area of an opening in a direction in which light is incident may be smaller than an area of an opening in the opposite direction. Alternatively, the liquid lens 142 may be disposed so that an inclination direction of the cavity CA is opposite. That is, the area of the opening of the cavity CA in the direction in which the light is incident may also be greater than the area of the opening in the opposite direction. In addition, when the liquid lens 142 is disposed so that the inclination direction of the cavity CA is opposite, due to the inclination direction of the liquid lens 142, all or a part of a layout of components included in the liquid lens 142 may be changed, or only the inclination direction of the cavity CA may be changed and the layout of the other components may not be changed.

The spacer 143 may be disposed to surround the liquid lens 142 to protect the liquid lens 142 from an external impact. To this end, the spacer 143 may have a shape in which the liquid lens 142 may be installed, seated, in contact with, fixed, temporarily fixed, supported, coupled, and disposed.

For example, the spacer 143 may include a hollow 143H in which the liquid lens 142 is accommodated and a frame surrounding the hollow 143H formed at a central portion. Accordingly, the spacer 143 may have a quadrangular flat shape of which a central portion is open (hereinafter, a "□" shape), but the embodiment is not limited thereto.

In addition, the spacer 143 may be disposed between the first connecting substrate 141 and the second connecting substrate 144 and disposed to protrude from the openings of the holder 120.

In addition, the liquid lens 142 may include a plurality of liquids LQ1 and LQ2 having different types, first to third plates 147, 145, and 146, first and second electrodes E1 and E2, and an insulating layer 148. The liquid lens 142 may further include an optical layer 190.

In addition, the plurality of liquids LQ1 and LQ2 are accommodated in the cavity CA and may include a first liquid LQ1 which is conductive and a second liquid (or insulating liquid) LQ2 which is non-conductive. In addition, the first liquid LQ1 and the second liquid LQ2 are not mixed with each other, and an interface BO may be formed at a portion which is disposed between the first and second liquids LQ1 and LQ2 and at which the first and second liquids LQ1 and LQ2 are in contact with each other. In addition, the second liquid LQ2 may be disposed on the first liquid LQ1, but the embodiment is not limited thereto.

In addition, in a cross-sectional shape of the liquid lens 142, thicknesses of edges of the first and second liquids LQ2 and LQ1 may be smaller than thicknesses of central portions of the first and second liquids LQ2 and LQ1. However, the present invention is not limited thereto. In addition, the first liquid LQ1 may be oil.

An inner surface of the first plate 147 may constitute a sidewall i of the cavity CA. The first plate 147 may include a vertical open part having a predetermined inclined surface. That is, the cavity CA may be a region surrounded by the inclined surface of the first plate 147, the second plate 145, and the third plate 146.

In addition, according to the embodiment, a size (or an area or width) 01 of an upper opening may be greater than a size (or an area or width) 02 of a lower opening. In this case, a size of each of the upper opening and the lower opening may be a cross-sectional area in a horizontal direction (for example, an x-axis direction or a y-axis direction). For example, the size of the opening may be a radius when a cross section of the opening has a circular shape and may be a length of a diagonal line when the cross section of the opening has a square shape. In addition, the diameter of the opening may vary according to a field of view (FOV) required for the liquid lens 142 or a role that the liquid lens 142 serves in the camera module 100.

In addition, each of the openings may have a hole shape having a circular cross section. The interface BO may move along an inclined surface of the cavity CA according to a driving voltage.

In addition, the first liquid LQ1 and the second liquid LQ2 may fill, be accommodated in, or be disposed in the cavity CA. In addition, the cavity CA is a portion through which light passing through the first lens parts 110 and 110A passes. In addition, since the first plate 147 is positioned outside the cavity CA, the first plate 147 may be formed of a transparent material. In addition, the first plate 147 may also include impurities in order to not allow light to pass therethrough easily.

In addition, electrodes may be disposed on one surface of the first plate 147 and the other surface thereof. The plurality of first electrodes E1 may be disposed to be spaced apart from the second electrode E2 and may be disposed on one surface (for example, an upper surface, a side surface, or a lower surface) of the first plate 147. The second electrode E2 may be disposed in at least a partial region of the other surface (for example, the lower surface) of the first plate 147 and may be in direct contact with the first liquid LQ1.

In addition, the first electrodes E1 may include n electrodes (hereinafter, individual electrodes), and the second electrode E2 may include one electrode (hereinafter, a common electrode). In this case, n is an integer greater than or equal to two. In this case, a case in which there are four first electrodes E1 and one second electrode E2 will be described. That is, two ends electrically connected to the liquid lens 142 may be any one of the plurality of first electrodes E1 and the second electrode E2.

In addition, a part of the second electrode E2 (that is an electrode sector of the second electrode E2) disposed on the other surface of the first plate 147 may be exposed to the conductive first liquid LQ1.

The first and second electrodes E1 and E2 may be formed of conductive materials. In addition, the second plate 145 may be disposed on one surface of the first electrode E1. That is, the second plate 145 may be disposed on the first plate 147. Specifically, the second plate 145 may be disposed on an upper surface of the first electrode E1 and the cavity CA.

The third plate 146 may be disposed on one surface of the second electrode E2. That is, the third plate 146 may be disposed under the first plate 147. Specifically, the third plate 146 may be disposed under a lower surface of the second electrode E2 and the cavity CA.

The second plate 145 and the third plate 146 may be disposed with the first plate 147 interposed therebetween in opposite directions. In addition, at least one of the second plate 145 and the third plate 146 may also be omitted.

Meanwhile, the optical layer 190 may be disposed on one surface of at least one of the second plate 145 and the third plate 146. For example, the optical layer 190 may be disposed at at least one side of upper and lower sides of the second plate 145, may be disposed at at least one side of upper and lower sides of the third plate 146, and may also be disposed at at least one side of upper and lower sides of each of the second and third plates 145 and 146.

In addition, although the liquid lens 142 and the optical layer 190 are individually illustrated, the optical layer 190 may also be a component of the liquid lens 142. In addition, while it is illustrated that the optical layer 190 is a single layer, this is only to illustrate presence of the optical layer 190. That is, the optical layer 190 may be a single layer or multiple layers.

In addition, the optical layer 190 may include at least one of a UV cut-off layer, an anti-reflection layer, and an IR cut-off layer. The optical layer 190 may be disposed to overlap the image sensor 30 in a direction of the optical axis LX (that is, a z-axis direction) or a direction parallel to the optical axis direction. In addition, the optical layer 190 may be disposed in the third region A3 of the liquid lens part 140. For example, the UV cut-off layer may block light in a UV region, particularly a UV-A region. The UV cut-off layer may be disposed in a region in which light is incident on the liquid lens 142, and may block UV light, particularly, light in a UV-A region which may be transmitted from the first lens parts 110 and 110A. Since light in a UV-C region has a relatively short wavelength and a weak penetration force, most light in the UV-C region is blocked by an ozone layer, and light in a UV-B region is blocked by general glass, but since light in the UV-A region passes through general glass, an additional cut-off layer may be particularly required.

In addition, the anti-reflection layer may serve to inhibit light from being reflected by the second plate 145 or the third plate 146, serve to reduce reduction of light transmittance due to Fresnel loss in the liquid lens 142, and also serve to inhibit degradation of night visibility of the liquid lens 142. Particularly, although not illustrated, the anti-reflection layer may be disposed on an inclined surface and a lower surface of the insulating layer 148 and may inhibit quality of light reflected and transmitted to the image sensor 30 from being degraded.

In addition, an IR cut-off layer may block light in an IR region. The IR cut-off layer may inhibit IR light from being incident on the liquid lens 142 from the outside to remove heat mura of an image and reduce light reflection by a surface of the liquid lens 142 to inhibit reduction of night visibility.

In addition, at least one of the UV cut-off layer, the anti-reflection layer, and the IR cut-off layer may be disposed at at least one of a light input part and a light output part of the camera module 100 according to the embodiment.

In addition, the optical layer 190 according to the embodiment may have a coated form or film form. For example, the anti-reflection layer of the optical layer 190 may be formed by coating in a spray manner at a low-temperature.

FIGS. 5A to 5E are views for describing a driving method of the liquid lens part. Hereinafter, a case in which a voltage is applied between the first electrode and the second electrode will be described.

Figure 5A:
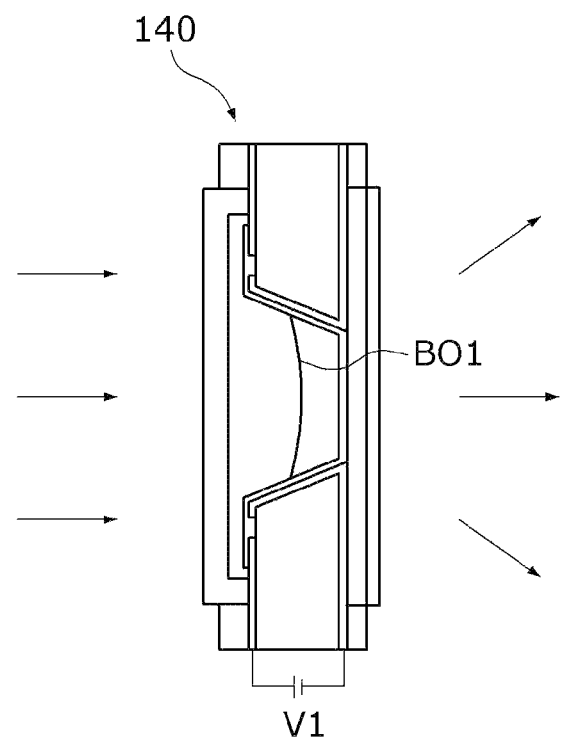
FIGS. 5A to 5E are views for describing a driving method of the liquid lens part.
Figure 5B:
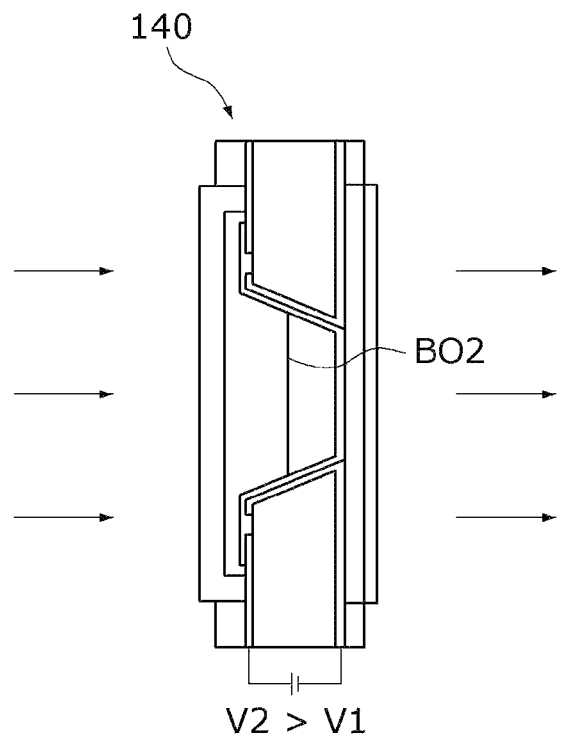

First, in FIG. 5A, a first voltage V1 is applied to the liquid lens part 140 so that an interface BO1 of the liquid lens may be convex in a light propagation direction. Accordingly, it is illustrated that the liquid lens part operates as a concave lens. In addition, in FIG. 5B, a second voltage V2 greater than the first voltage V1 is applied to the liquid lens part 140 so that an interface BO2 of the liquid lens may be perpendicular to the light propagation direction. Accordingly, it is illustrated that the liquid lens part does not change the light propagation direction. In addition, in FIG. 5C, a third voltage V3 greater than the second voltage V2 is applied to the liquid lens part 140 so that an interface BO3 of the liquid lens may be convex in a direction opposite to the light propagation direction. Accordingly, it is illustrated that the liquid lens part operates as a convex lens. In this case, when the first voltage V1 to third voltage V3 are applied thereto, the interfaces BO1, BO2, and BO3 of the liquid lens in the liquid lens part 140 may have curvatures different from each other.

That is, in the liquid lens part 140 according to the embodiment, it is illustrated that a curvature or diopter of the liquid lens of the liquid lens part is changed according to a level of the applied voltage, but the present invention is not limited thereto, and the curvature or diopter of the liquid lens may also be changed according to a pulse width of an applied pulse.

Figure 5C:
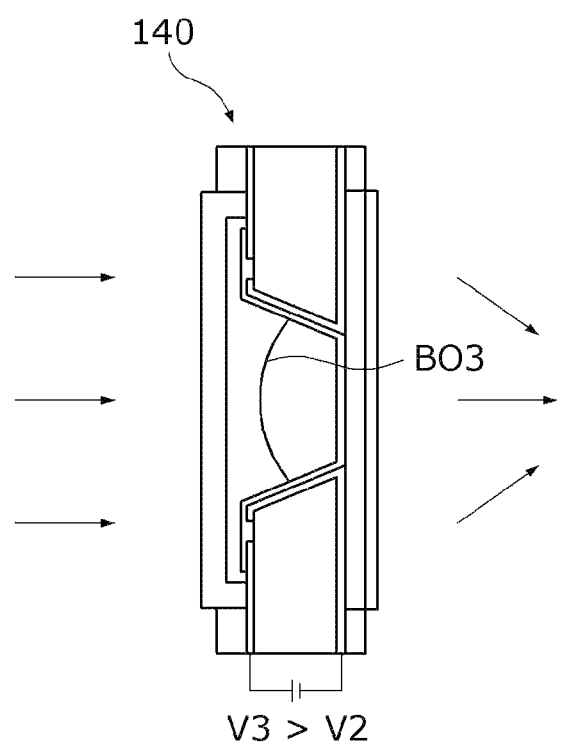
Figure 5D:
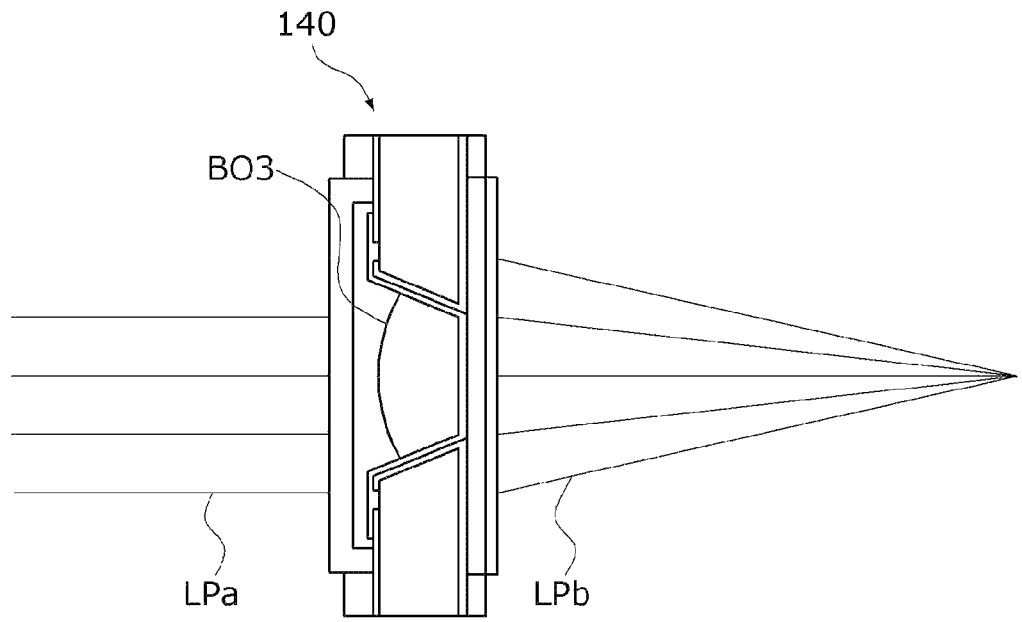

In addition, in FIG. 5D, it is illustrated that the liquid lens in the liquid lens part 140 has a curvature BO3 which is the same as in FIG. 5C so that the liquid lens operates as the convex lens. Accordingly, in FIG. 5D, incident light LPa is concentrated so that corresponding output light LPb is output.

Figure 5E:
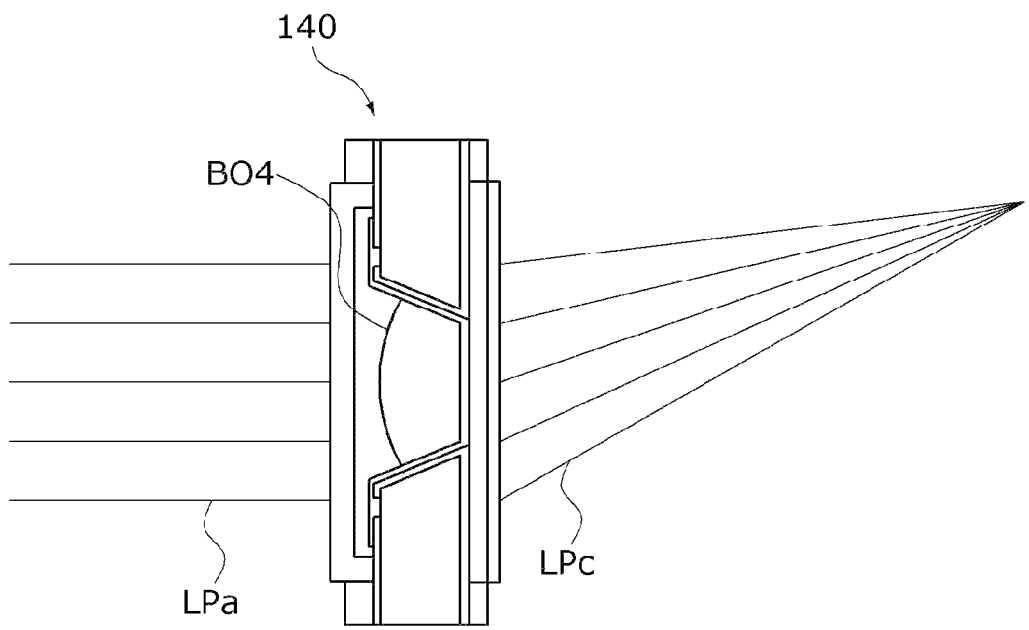

In addition, in FIG. 5E, it is illustrated that, since the liquid lens in the liquid lens part 140 has an asymmetric curved surface (for example, an interface is convex at an upper portion thereof in the direction opposite to the light propagation direction), the light propagation direction is changed toward one side (for example, an upper side). That is, according to FIG. 5D, the incident light LPa is concentrated on the upper side so that corresponding output light LPc is output.

Figure 6:
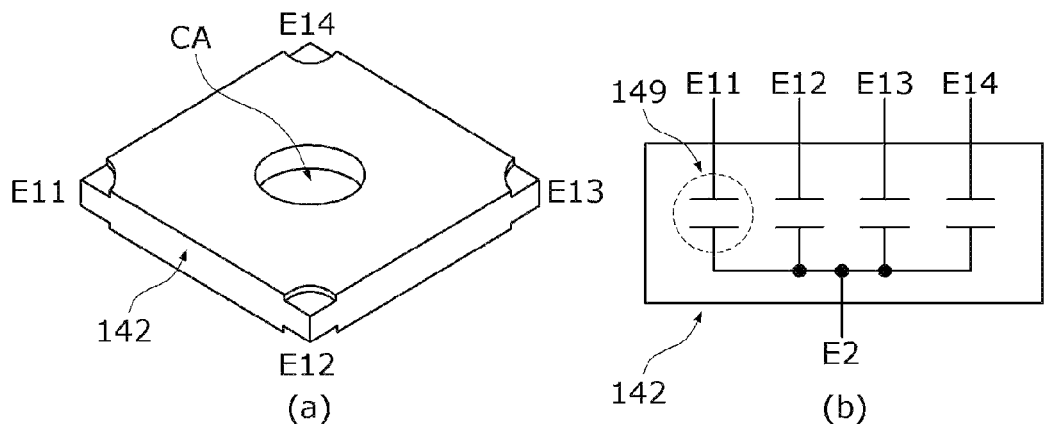
FIG. 6 is a set of views for describing the liquid lens part of which an interface is adjusted to correspond to a driving voltage.

FIG. 6 is a set of views for describing the liquid lens part of which an interface is adjusted to correspond to a driving voltage.

Referring to FIG. 6, the liquid lens part will be described with reference to FIG. 6(a), and an equivalent circuit of the liquid lens part will be described with reference to FIG. 6(b).

Referring to FIG. 6(a), a lens 142 of which a focal distance is adjusted to correspond to a driving voltage may receive a voltage through individual terminals L1, L2, L3, and L4 which have the same angular distance and are disposed in four directions different from each other. The individual terminals may be disposed at the same angular distance from a central axis of the liquid lens and four individual terminals. Four individual terminals may be disposed at four corners of the liquid lens. When the voltage is applied through the individual terminals L1, L2, L3, and L4, a shape of an interface of the liquid lens is changed due to a driving voltage generated due to an interaction between the applied voltage and a voltage applied through a common terminal C0.

In addition, referring to FIG. 6(b), one side of the liquid lens 142 may receive an operating voltage through the different individual terminals L1, L2, L3, and L4, and another side may be electrically connected to the common terminal C0. In addition, the common terminal C0 and a plurality of capacitors 149 may be connected. In addition, the plurality of capacitors 149 included in the equivalent circuit may have a low capacitance of about several tens to 200 pF or less. The terminals of the liquid lens may also be referred to as electrode sectors or sub-electrodes.

Figure 7A:
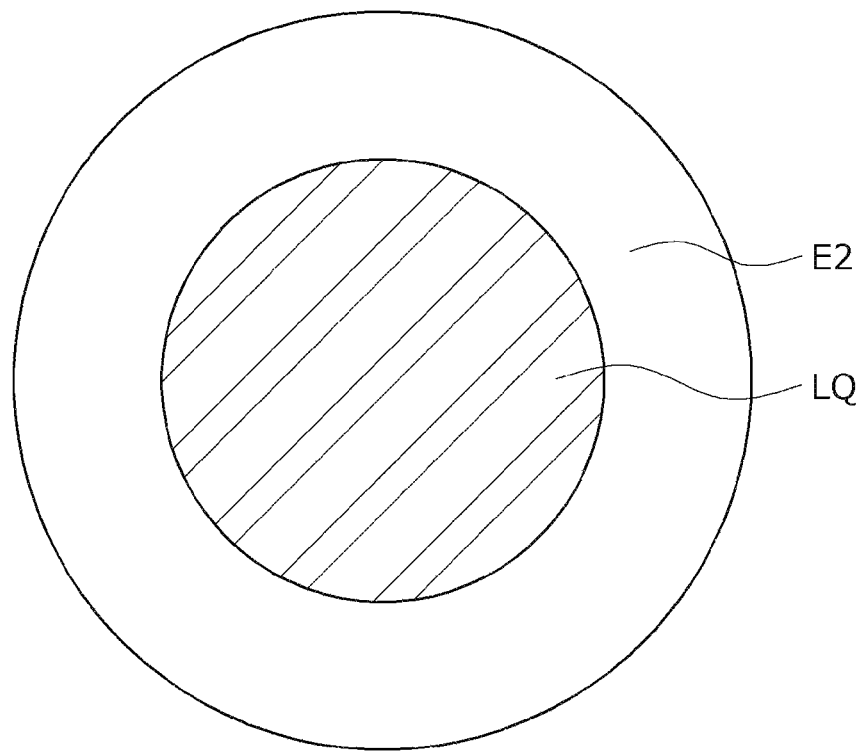
FIGS. 7A and 7B are views illustrating a structure of the liquid lens part.
Figure 7B:
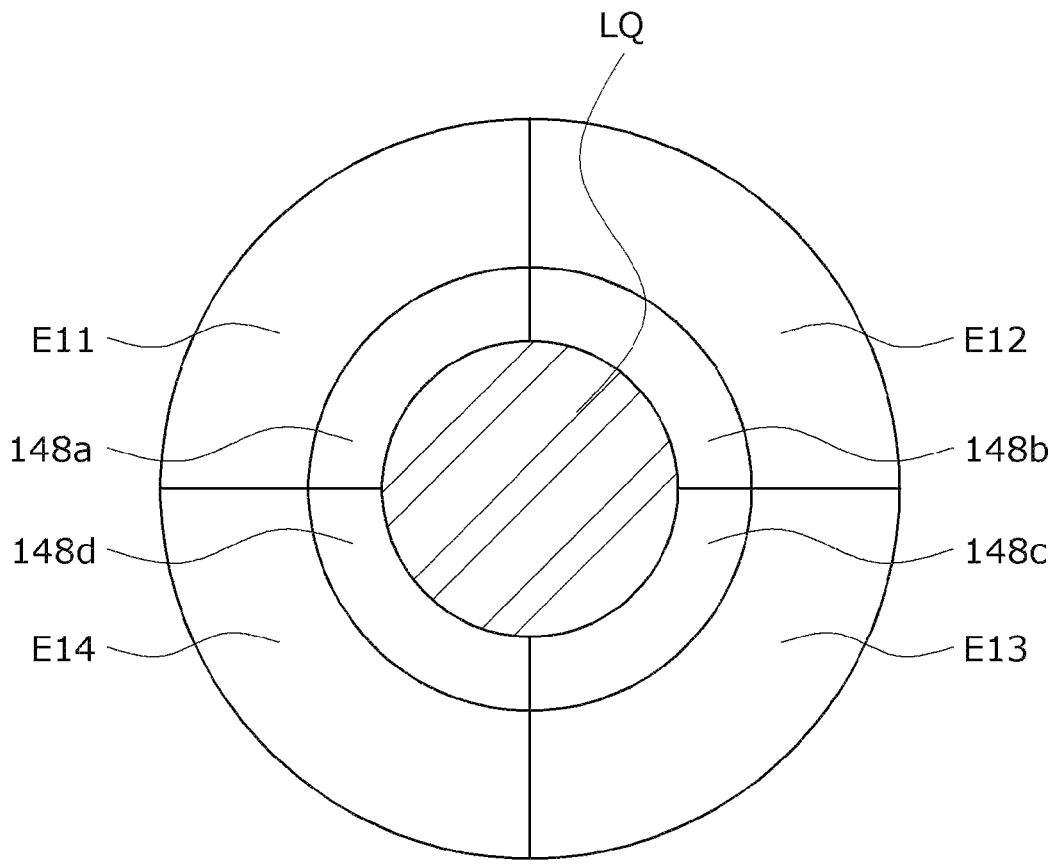

FIGS. 7A and 7B are views illustrating a structure of the liquid lens part.

Referring to FIG. 7A, a common electrode E2 (corresponding to the second electrode) may be disposed at one side of the liquid lens part 140. In this case, the common electrode E2 may be disposed in a tube form, and a liquid LQ may be disposed in a lower region of the common electrode E2, particularly, in a region corresponding to a hollow.

Meanwhile, although not illustrated in the drawings, an insulating layer may be disposed between the common electrode E2 and the liquid LQ in order to insulate the common electrode E2.

In addition, as in FIG. 7B, a plurality of first electrodes E11 to E14 may be disposed under the common electrode, particularly, under the liquid LQ. Particularly, the plurality of first electrodes E11 to E14 may be formed in a shape surrounding the liquid LQ.

In addition, a plurality of insulating layers 148a to 148d for insulation may be disposed between the plurality of first electrodes E11 to E14 and the liquid LQ, respectively.

Figure 8:
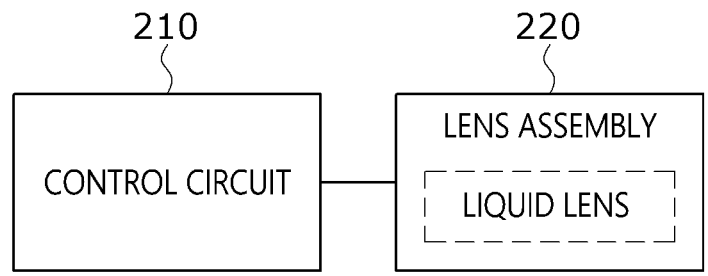
FIG. 8 is a block diagram illustrating a camera module according to the embodiment.
Figure 9A:
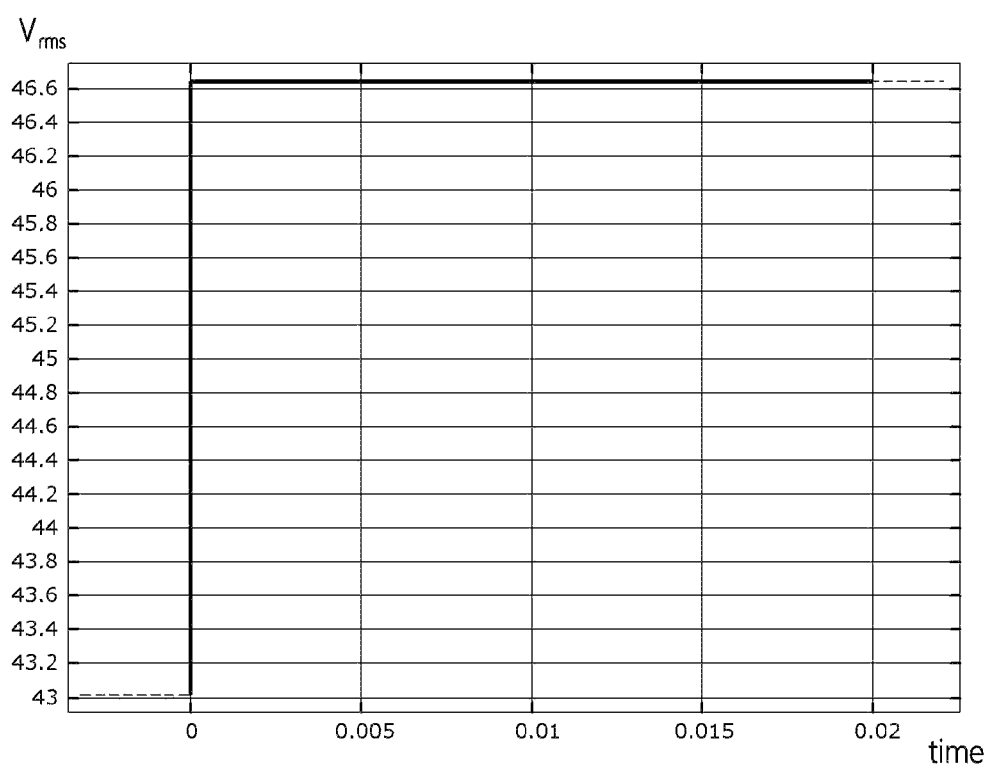
FIGS. 9A and 9B are views for describing the form of a driving signal according to the embodiment.
Figure 9B:
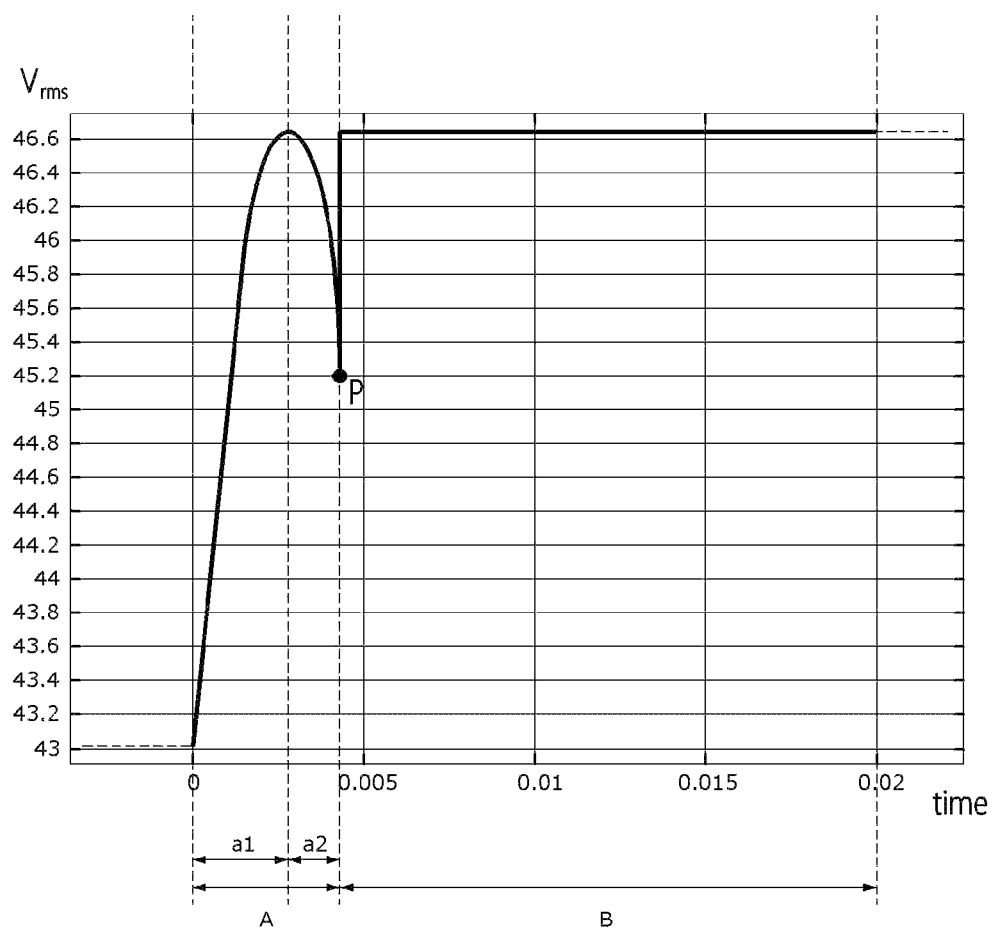

FIG. 8 is a block diagram illustrating a camera module according to an embodiment. FIGS. 9A and 9B are views for describing the form of a driving signal according to the embodiment, and FIG. 10 is a set of views for describing a principle of generating the driving signal according to the embodiment.

Referring to FIG. 8, the camera module according to the embodiment may include a control circuit 210 and a lens assembly 220 including a liquid lens. In this case, the control circuit 210 may correspond to the control circuit 20 described above, and the lens assembly 220 may correspond to the lens assembly 10, that is, may correspond to the lens assembly 110, 120, 130, 140, 162, and 164 described above.

The lens assembly 220 may include a plurality of lens parts, and the plurality of lens parts may include the liquid lens.

The control circuit 210 may generate a driving signal having a waveform which varies according to a section in order to drive the liquid lens and apply the driving signal to the liquid lens in the lens assembly 220.

In this case, the driving signal may include a driving signal having the form of a standing wave for forming an interface of the liquid lens and a driving signal having the form of a pulse wave for maintaining the interface of the liquid lens.

Accordingly, the control circuit 210 may form the interface of the liquid lens by generating and applying the driving signal having the form of the standing wave and generating and applying the driving signal having the form of the pulse wave.

In this case, the driving signal according to the embodiment may be a driving voltage which is generated due to an interaction between a voltage applied to an individual terminal of the liquid lens and a voltage applied to a common terminal.

Referring to FIG. 9A, conventionally, a driving signal having the form of a pulse wave is generated and applied, and a driving signal of a voltage predetermined for forming an interface of a liquid lens is generated.

Referring to FIG. 9B, in the embodiment, the section in which the driving signal is applied may be divided into a first section A in which the interface of the liquid lens is formed and a second section B in which the interface of the liquid lens is maintained.

In the first section A, a first driving signal having the form of a standing wave having a predetermined amplitude for forming an interface of the liquid lens corresponding to a corresponding diopter may be generated, and in the second section B, a second driving signal having the form of a pulse wave having a predetermined amplitude for maintaining the interface of the liquid lens formed by the first driving signal may be generated. Here, an example of a case in which a frequency of the first driving signal is set to 100 Hz will be described.

In this case, the amplitude of the first driving signal may be smaller than or equal to the amplitude of the second driving signal, and preferably, the amplitude of the first driving signal may be the equal to the amplitude of the second driving signal.

This is because a wavefront error (WFE) may become larger when the amplitude of the first driving signal is set to be greater than the amplitude of the second driving signal, and thus the amplitude of the first driving signal should be set to be smaller than or equal to the amplitude of the second driving signal.

The first section A may be further divided into a first sub-section a1 and a second sub-section a2, the first sub-section a1 may be a main section within which the interface of the liquid lens is formed, and the second sub-section a2 may be an auxiliary section within which the interface of the liquid lens is formed. That is, while a shape of the interface of the liquid lens is formed within the first sub-section a1, when the corresponding signal is applied, the shape of the interface may not be immediately formed, and after a predetermined time elapses, the shape may be completely formed.

In this case, the first sub-section a1 may be a predetermined section, and the second sub-section a2 may be a section which varies according to a material structure of the liquid lens. In this case, the concept of the material structure of the liquid lens may encompass a type, a composition ratio, a degree of deformation, and the like of a liquid constituting the liquid lens.

The first section A may be longer than or equal to ¼ and shorter than or equal to ½ of one period of the first driving signal. In addition, a time point P, at which the second sub-section a2 ends, may be positioned within ¼ to ½ of one period of the first driving signal. That is, the control circuit 210 may generate a signal which is longer than or equal to ¼ and shorter than or equal to ½ of one period of the first driving signal.

A principle of generating the first driving signal will be described below.

Referring to FIG. 10, a wave trapped in a limited space forms a standing wave, in the embodiment, the standing wave is used to generate a driving signal for adjusting the interface of the liquid lens.

A wavelength λn of a standing wave in a waveguide, which has a length L and of which both ends open, is defined as in [Equation 1] below.

$$\lambda_n = \frac{2L}{n}, \quad \text{[Equation 1]}$$

$$n = 1, 2, 3, \ldots$$

A relationship between the wavelength λ and a frequency f is defined as in [Equation 2] below.

$$v = \lambda f \quad \text{[Equation 2]}$$

According to the number n of nodes, FIG. 10A shows a first harmonic when the number n is 1, FIG. 10B shows a second harmonic when the number n is 2, and FIG. 10C shows a third harmonic when the number n is 3. In the embodiment, the second harmonic when the number n is 2 will be used.

Meanwhile, the liquid lens has characteristics of a capillary wave, and a capillary wave is a wave moving at a boundary interface of a liquid.

A wavenumber k of the capillary wave is defined as in [Equation 3] below.

$$k = \frac{2\pi}{\lambda} = \frac{2\pi}{L} \quad \text{[Equation 3]}$$

In this case, λ denotes a wavelength, and L denotes a length.

A dispersion relation of the capillary wave is defined as in [Equation 4] below.

$$\omega^2 = \frac{\sigma}{p + p'}|k|^3 \quad \text{[Equation 4]}$$

In this case, ω denotes an angular frequency, σ denotes a surface tension, p denotes a density of a heavier fluid, and ρ' denotes a density of a lighter fluid.

A phase velocity cp of the capillary wave is defined as in [Equation 5] below.

$$c_p = \frac{\lambda}{T} = \frac{\omega}{k} \quad \text{[Equation 5]}$$

Here, T denotes a period.

From [Equation 2], a frequency of a second harmonic f2 is defined as in [Equation 6].

$$f_2 = \frac{v}{L} = \frac{c_p}{D} \quad \text{[Equation 6]}$$

In this case, v denotes a phase velocity of the standing wave, L denotes a length, and D denotes a diameter of a liquid lens.

In the embodiment, a frequency f of the first driving signal is set to be the same as the frequency of the second harmonic calculated using [Equation 6], and a range of the frequency f is defined as in [Equation 7] below.

$$80 \text{ Hz} \leq f \leq 150 \text{ Hz} \quad \text{[Equation 7]}$$

Accordingly, the frequency f of the first driving signal may be determined by the diameter of the liquid lens and the phase velocity of the capillary wave. In this case, since the phase velocity of the capillary wave is determined by the density of the heavier fluid, the density of the lighter fluid, the surface tension, and the wavenumber, the frequency f of the first driving signal may be determined by the diameter of the liquid lens, the density of the fluid, the surface tension, and the wavenumber.

Accordingly, since the liquid lens has the characteristics of the capillary wave, the frequency of the second harmonic obtained from the capillary wave will be used as a frequency of a standing wave which is a driving signal. Accordingly, the interface of the liquid lens can be adjusted in consideration of the characteristics of the liquid lens.

Figure 11:
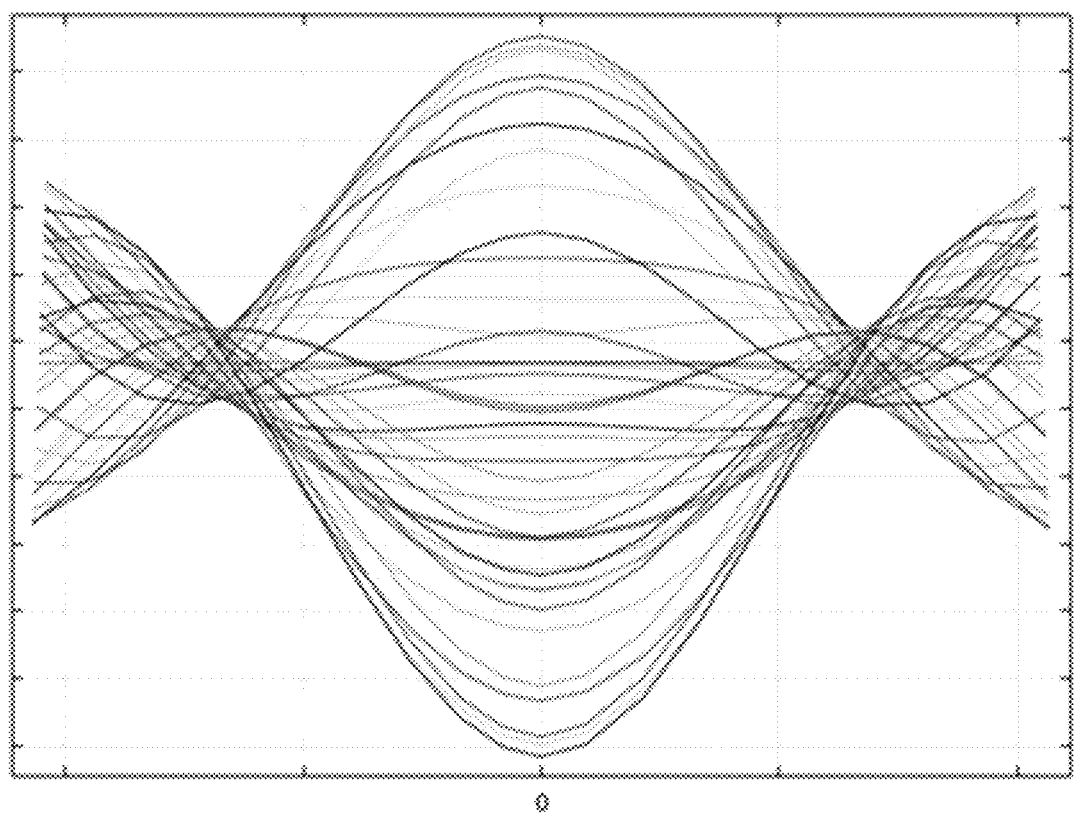
FIG. 11 is a view illustrating various forms of a standing wave according to the embodiment.

FIG. 11 is a view illustrating various forms of a standing wave according to the embodiment.

Referring to FIG. 11, since a standing wave has a form which is trapped in a limited space and oscillates in place, a node which is a point at which the wave does not move over time and an antinode which is a point at which the wave most greatly oscillates in place are formed.

An example of a case in which standing waves having different amplitudes are generated through a simulation is shown, and it can be seen that nodes at which the wave does not move are formed. When the standing waves having different amplitudes are applied to the liquid lens, the interface of the liquid lens may be adjusted. That is, even with a change in amplitude of the applied standing wave, the interface of the liquid lens can be adjusted.

Figure 12:
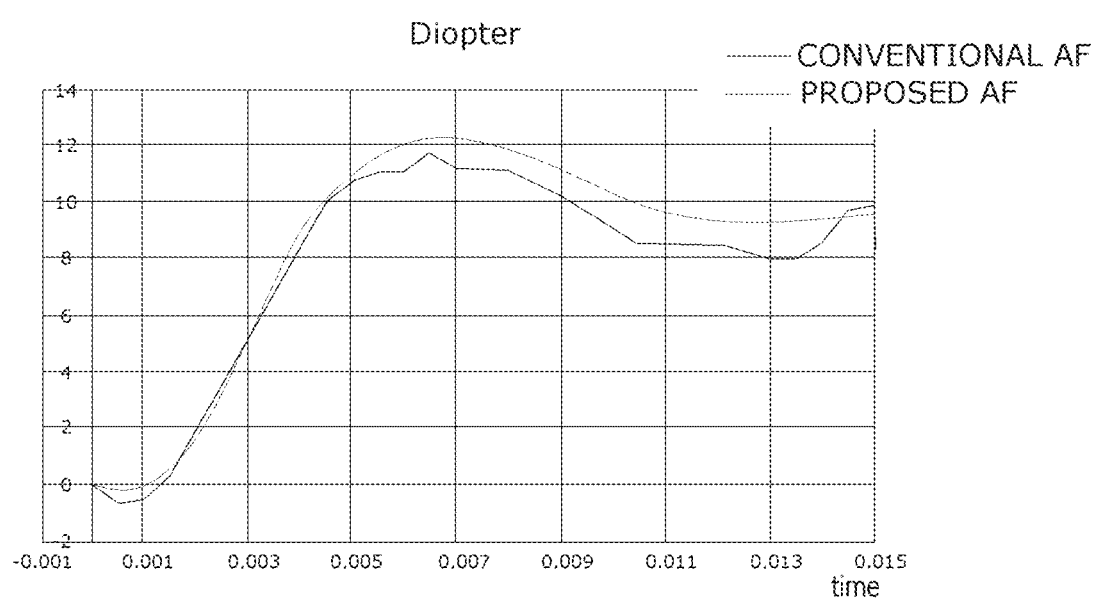
FIG. 12 is a graph showing a change in diopter when the driving signal according to the embodiment is used.
Figure 13:
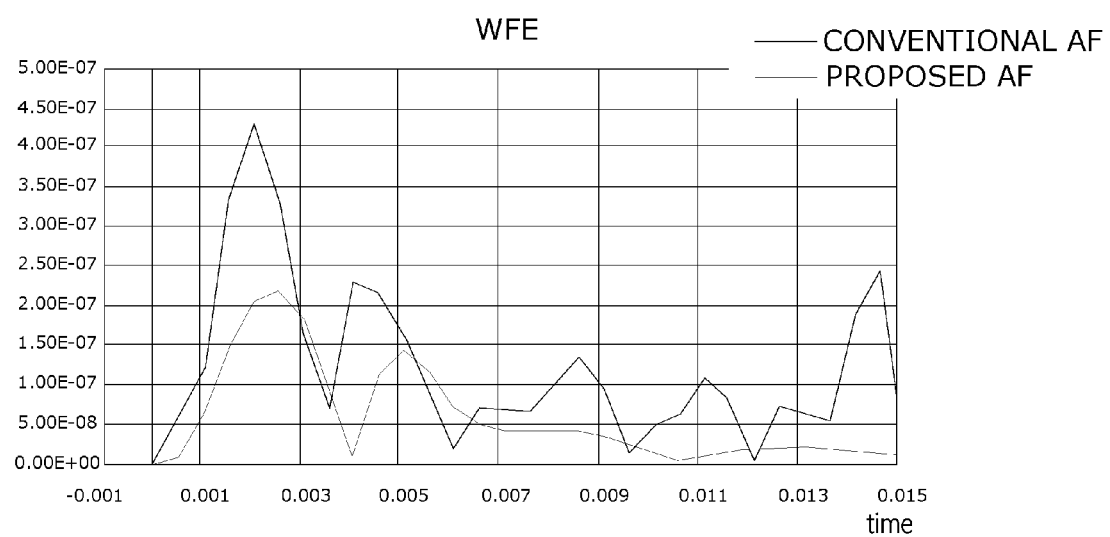
FIG. 13 is a graph showing a change in wavefront error (WFE) when the driving signal according to the embodiment is used.

FIG. 12 is a graph showing a change in diopter when the driving signal according to the embodiment is used, and FIG. 13 is a graph showing a change in WFE when the driving signal according to the embodiment is used.

Referring to FIG. 12, a change in diopter of a case in which the conventional driving signal of FIG. 9A is applied and a change in diopter of a case in which a proposed driving signal of FIG. 9B is applied are shown, and it can be seen that a reaction speed is not changed.

Here, a case in which a curvature or diopter of the liquid lens becomes 10 is shown.

Referring to FIG. 13, a change in WFE of the case in which the conventional driving signal of FIG. 9A is applied and a change in WFE of the case in which the proposed driving signal of FIG. 9B is applied are shown, and it can be seen that the WFE is reduced when compared to the conventional case.

Accordingly, when the driving signal according to the embodiment is applied, the WFE can be reduced without changing the reaction speed.

Terms such as "unit" used in the present embodiment refer to software or a hardware component such as a field-programmable gate array (FPGA) or an application-specific integrated circuit (ASIC), and objects termed "unit" perform certain roles. However, the term "unit" is not limited to software or hardware. A "unit" may be configured to reside on an addressable storage medium or to reproduce one or more processors. Thus, in an example, the term "unit" includes components such as software components, object-oriented software components, class components, task components, processes, functions, properties, procedures, subroutines, segments of program code, drivers, firmware, micro-code, circuits, data, databases, data structures, tables, arrays, and variables. Functions provided by these components and "units" may be combined into a smaller number of components and "units" or may be subdivided into additional components and "units." Furthermore, the components and "units" may also be implemented to reproduce one or more central processing units (CPUs) within a device or a security multimedia card.

While the present invention has been described above with reference to exemplary embodiments, it may be understood by those skilled in the art that various modifications and changes of the present invention may be made within a range without departing from the spirit and scope of the present invention defined by the appended claims.

The invention claimed is:

1. An optical device comprising:
   a lens assembly including a liquid lens; and
   a control circuit configured to generate a driving signal for driving the liquid lens,
   wherein the driving signal includes a first section and a second section in which driving signals have different waveforms,
   wherein a first driving signal having a form of a standing wave is generated in the first section; and
   wherein a second driving signal having a form of a pulse wave is generated in the second section.

2. The optical device of claim 1, wherein the control circuit generates a signal longer than or equal to ¼ of one period of the first driving signal.

3. The optical device of claim 1, wherein the control circuit generates a signal shorter than or equal to ½ of one period of the first driving signal.

4. The optical device of claim 1, wherein an amplitude of the first driving signal is smaller than or equal to an amplitude of the second driving signal.

5. The optical device of claim 1, wherein a frequency of the first driving signal is in a range of 80 Hz to 150 Hz.

6. The optical device of claim 5, wherein the frequency of the first driving signal is determined by a wavenumber, a density and a surface tension of a liquid, and a diameter of a lens.

7. The optical device of claim 1, wherein the liquid lens is designed to have a characteristic of a capillary wave.

8. A method of driving an optical device comprising:
generating, by a control circuit, a driving signal for driving a liquid lens; and
applying, by the control circuit, the generated driving signal to the liquid lens,
wherein the driving signal includes a first section and a second section in which driving signals have different waveforms,
wherein a first driving signal having a form of a standing wave is generated in the first section; and
wherein a second driving signal having a form of a pulse wave is generated in the second section.

* * * * *